(12) United States Patent
Cheng et al.

(10) Patent No.: US 6,529,328 B1
(45) Date of Patent: Mar. 4, 2003

(54) OPTICAL FILTER

(75) Inventors: Yihao Cheng, Kanata (CA); Donald R. Zimmerman, Farmingdale, NJ (US)

(73) Assignee: JDS Fitel Inc., Ottawa ( * ) Notice: Subject to any disclaimer, the term of this patent is extended or adjusted under 35 U.S.C. 154(b) by 0 days.

(21) Appl. No.: 09/363,824

(22) Filed: Jul. 30, 1999

Related U.S. Application Data (63) Continuation-in-part of application No. 09/309,489, filed on May 11, 1999.
(60) Provisional application No. 60/095,646, filed on Aug. 7, 1998.

(51) Int. Cl.[7] .............................................. G02B 27/00
(52) U.S. Cl. ..................... 359/578; 359/589; 359/260; 372/20
(58) Field of Search .............................. 359/584, 589, 359/838, 857, 578, 260, 261; 372/20, 29, 32, 99; 356/454

(56) References Cited

U.S. PATENT DOCUMENTS

| | | | |
|---|---|---|---|
| 3,775,699 A | * 11/1973 | Cassels ........................ | 372/19 |
| 5,125,922 A | * 6/1992 | Dwyer et al. .................. | 606/3 |
| 5,434,874 A | * 7/1995 | Fouquet et al. ............... | 372/20 |
| 5,436,760 A | 7/1995 | Nakabayashi ............... | 359/341 |
| 5,452,121 A | 9/1995 | Hilgeman ................... | 359/260 |
| 5,798,859 A | 8/1998 | Colbourne et al. .......... | 359/247 |
| 5,880,874 A | 3/1999 | Shibuya et al. .............. | 359/337 |

OTHER PUBLICATIONS

European Search Report EP 00 91 0102 Aug. 31, 2001.

* cited by examiner

*Primary Examiner*—Cassandra Spyrou
*Assistant Examiner*—Arnel C. Lavarias
(74) *Attorney, Agent, or Firm*—Lacasse & Associates, LLC

(57) ABSTRACT

This invention relates to invention relates to a variable slope optical filter in the form of a Fabry-Perôt etalon having an end face with a variable finesse. A method for filtering and a variable slope optical filter for in-line use with an optical amplifier signal is also disclosed. The filter has a wavelength response that is substantially linear in slope within a band of operation wavelengths of the amplifier; the slope of the filter in an operating band of wavelengths is between zero and a only one of a positive or negative number; furthermore the filter has an amplitude response that has an opposite and counter slope as a function of wavelength to that of a gain tilt of the amplifier within the operation band of wavelengths. Relative movement between the filter and the optical amplifier signal is provided to vary the slope of the filter by means of varying the amplitude wavelength response of the filter.

15 Claims, 9 Drawing Sheets

OPTICAL FILTER

This is a continuation-in-part of U.S. patent application Ser. No. 09/309,489 filed May 11, 1999, which claims priority from U.S. Provisional patent application No. 60/095,646, filed Aug. 7, 1998.

This invention relates to a variable reflectivity filter, and more particularly to an etalon having one or more end faces having a variable reflectance.

BACKGROUND OF THE INVENTION

Fabry-Perôt filters are widely used in optical systems where a dependence upon their periodic nature is required. For example, comb filters are now being developed wherein one or more etalons provide one or more output signals that are periodic in amplitude response. The free-spectral range, or period of a Fabry-Perot etalon is determined by a length of a gap between its two reflecting surfaces.

A multi-port tunable fiber-optic etalon filter (MTFET) having two spaced partially reflective mirrors is disclosed in U.S. Pat. No. 5,283,845 in the name of Ip assigned to JDS Fitel Inc. This filter has three or more ports, with at least two on one side and at least one on the other side of the etalon. A single signal can be filtered with the reflected signal being received, forming a wavelength division multiplexor, or a plurality of signals can be filtered, with or without the reflected signals being received. Ip provides a filter wherein the FSR is tunable within a range.

Another use for an etalon is described by Ip in U.S. Pat. No. 5,557,468 in the name of Ip assigned to JDS Fitel Inc., wherein an etalon is used a dispersion compensation device.

Yet another use for an etalon is described in U.S. Pat. No. 5,798,859 in the name of Colbourne et al. assigned to JDS Fitel Inc. and device for wavelength locking is provided, wherein an element having a wavelength dependent characteristic such as a Fabry-Perôt etalon is used to provide an output signal having an intensity that varies with wavelength. The intensity of a reference signal derived from an input signal is compared with an output from the Fabry-Perôt etalon to provide a feedback signal that corresponds to the frequency of the input signal. The system is calibrated before wavelength locking is performed to determine a ratio of intensities that determines a locked state or condition.

As can be seen from the above mentioned patents, Fabry-Perôt etalons have a variety of uses and are provided in a variety of forms.

Another type of etalon that differs from a fixed etalon, or even a tunable etalon as is described by Ip in U.S. Pat. No. 5,283,845 is one wherein the finesse or reflectivity of one or more of the reflectors is variable. Such a filter is described in U.S. Pat. No. 5,452,121 in the name of Hilgeman assigned to Northrop Grumman Corporation and is said to be useful as a spectral resolution agile filter.

The instant invention provides an etalon having a variable finesse over the length of at least one reflector.

One particular use for a filter of this type, is in the field of optical amplifiers and more particularly for gain tilt control.

Optical amplifiers and particularly erbium doped optical fiber amplifiers are nearly ubiquitous in optical transmission systems, particularly in the field of telecommunications. Erbium doped fiber amplifiers (EDFAs) have high polarization insensitive gain, low cross talk between signals of different wavelengths, good saturation output power, and a noise figure close to the fundamental quantum limit. The excellent noise characteristics allow hundreds of these amplifiers to be cascaded to cover spans of thousands of kilometers of optical fibre. EDFAs as opposed to electronic repeaters are also transparent to data rate, signal format, and wavelength over a limited range, making them useful for wavelength multiplexed (WDM) communication systems that simultaneously transmit a large number of signals using different wavelength bands for each signal.

Figure 1:
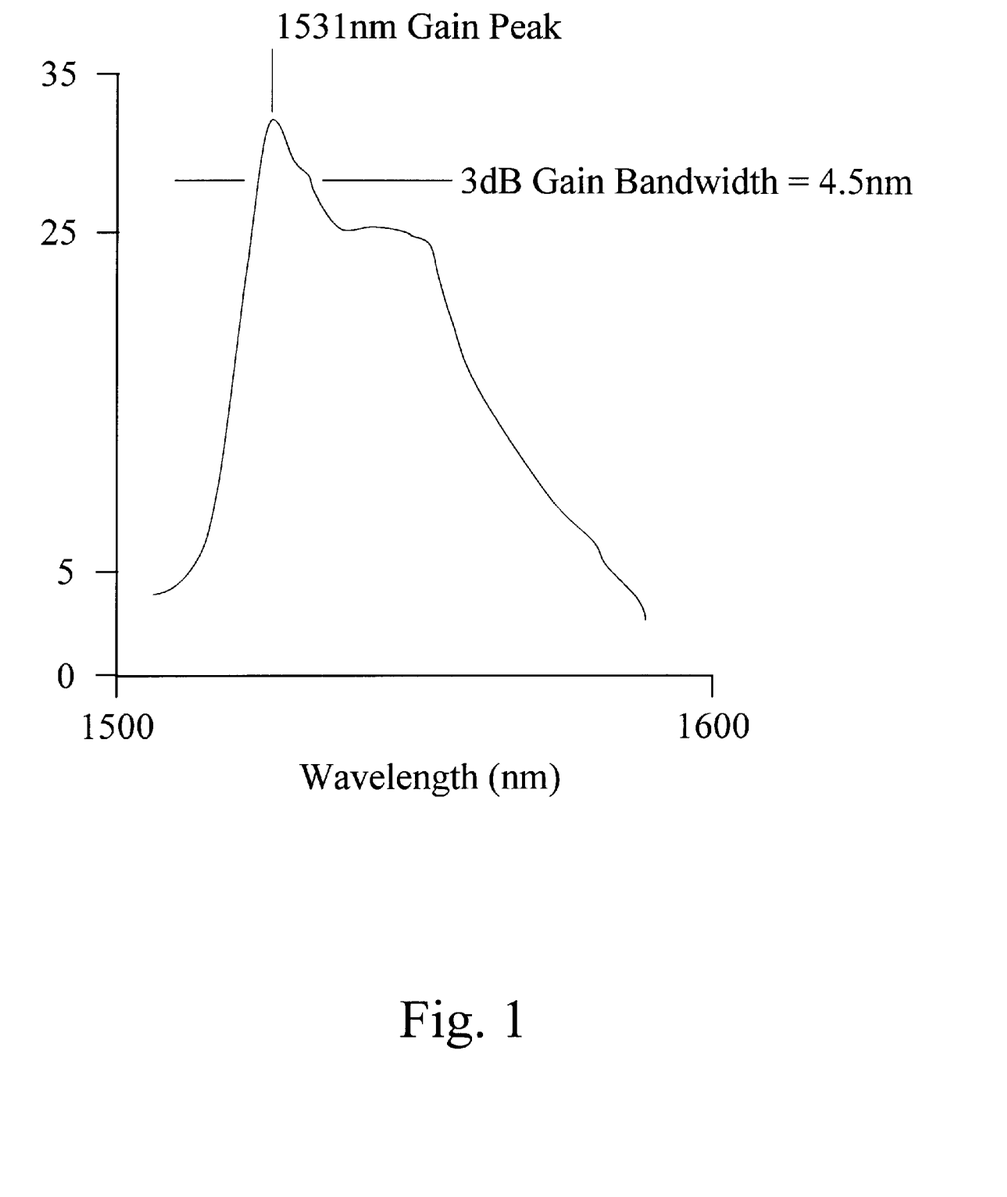
FIG. 1 is a graph of gain (dB) versus wavelength (nm) for a typical erbium doped amplifier.

Notwithstanding these generally excellent characteristics, a disadvantage associated with EDFAs is their narrow spectral width and uneven gain band. The useful telecommunications window of an EDFA is approximately 20–30 nm wide, while an ideal amplifier would have a flat spectral gain across the full spectrum which extends form approximately 1520 nm to 1570 nm. The peak wavelength of the erbium gain spectrum varies from about 1530 nm to about 1535 nm depending upon the host glass material. FIG. 1 shows the characteristic gain spectrum of a particular conventional EDFA where it can be seen that the gain as a function of wavelength varies; this variation will be referred to hereinafter as gain ripple. Numerous techniques have been published for widening and flattening the gain spectrum (i.e. reducing the ripple) and include for example co-doping an erbium-doped silica glass fibre with $Al_2O_3$; changing the host glass material itself; using various forms of attenuating filters to reduce the gain at the emission peak; and, constructing hybrid devices having two or more different types of serially connected erbium doped fibre and actively adjusting pump conditions independently in each fibre section to compensate for the different gain slopes of each fibre.

In addition to the aforementioned problems and solutions associated with minimizing gain ripple, another significant problem exists to which there have been no simple, inexpensive, and practicable solutions. This other significant problem solved by this invention relates to improving dynamic gain tilt. The term dynamic gain tilt as used hereafter means the variation in gain at one wavelength as a result of changing the gain at any other wavelength via a change in input EDFA operating conditions. Although the techniques described above for minimizing gain ripple can provide a relatively flat spectrum in a specified wavelength band for a specific set of input optical powers and wavelength, the gain equalization performance degrades rapidly when the gain is changed (change in average population inversion levels) from the nominal conditions by changing the input power to the amplifier. One reported solution to this problem is allegedly achieved by a hybrid fibre device having cascaded amplifying stages with different gain spectra and an equal number of pump sources to allow the gain spectra of the individual stages to be effectively tuned independently so that when the total gain is changed, the relative contribution of each stage can be adjusted to arrive at the desired gain, with a resulting gain spectrum having a minimal amount of spectral distortion over the selected wavelength band. As an example, an erbium doped fibre having a positive gain slope may be combined with a different erbium doped fibre having a negative gain slope such that the hybrid device has a nearly flat gain at specific input power conditions. However, if the overall gain of the hybrid device must be changed, the gain slope of each of the constituent states will generally change at different rates when the pump power input to one of the stages is changed. In order to achieve good compensation at the new operating point, the relative gain of each of the constituent gain stages must be readjusted to make the gain slopes compensate each other. In implementing this type of amplifier, one skilled in the art would likely cascade two or more different erbium doped fibre compositions and provide a separate pump source for each amplifying stage at an end of each stage so as to minimize the number of splices and make it as convenient as possible to independently control the pump power to each stage. However, this technique for reducing or improving dynamic gain tilt requires a complex control scheme during operation in which the total power of multiple pump sources must be coordinated in order to realize gain slope compensation over a range of different gains (i.e. to change input power while maintaining a fixed target output power).

U.S. Pat. No. 5,764,406 in the name of Newhouse et al. entitled Hybrid Optical Amplifier Dynamic Gain Tilt incorporated herein by reference, describes a system wherein an erbium doped fibre amplifier device has a dynamic gain tilt that is less then the gain tilt of any of the constituent fibres. The hybrid device has at most one less pumping source than the number of constituent waveguides of the device. The hybrid device automatically provides a change in the pump distribution among the constituent doped waveguide sections so as to achieve a readjustment of the relative gains of the constituent sections. In one embodiment, this invention provides constituent EDFs of different co-dopant compositions that provides an automatic change in the pump distribution or partitioning among the constituent EDF sections so as to achieve a readjustment of the relative gains of the constituent EDF sections.

Although the '406 patent appears to achieve its intended function, it is a relatively costly and is a complicated solution to dynamically controlling gain tilt.

Most known solutions for correcting for dynamic gain tilt have an associated power loss (approximately 5 dB) and furthermore, increased power is required for extra pumping. Another deleterious result of these systems is an increased resulting noise.

It is an object of this invention to provide a novel filter and method of use of such filter that can be placed in-line within an optical amplifier for varying the gain tilt dynamically as the power of the input signal is varied.

It is another object of the invention to provide an inexpensive filter for use in controlling tilt gain of an optical amplifier.

It is yet another object of the invention to provide an inexpensive etalon filter having a variable reflectance on one or more end faces suitable for use, for example in controlling tilt gain of an optical amplifier, but not limited thereto.

SUMMARY OF THE INVENTION

In accordance with the invention there is provided, a Fabry-Perôt etalon having two at least partially reflective end faces, at least one of the end faces having a variable reflectance along its length. The variable reflectance may be variable in a continuous linear manner over a particular region, or may be step-wise varied over at least two regions.

In accordance with the invention there is provided, a resonant optical cavity having a free spectral range greater than 20 nm, said cavity having a first end face and an at least second partially reflective end face, the first end face being partially reflective and having a reflectivity along its length which varies by at least 10%.

In accordance with the invention, there is provided, a variable slope optical filter for in-line use with an optical amplifier signal, the filter being disposed at an input side, an output side, or within the optical amplifier, the filter having a wavelength response that is substantially linear in slope within a band of operation wavelengths of the amplifier, the slope of the filter in said band of wavelengths being between zero and a only one of a positive or negative number, the filter for passing a band of wavelengths having a centre wavelength λc and having an amplitude response that has an opposite and counter slope as a function of wavelength to that of the amplifier's gain tilt within the operation band of wavelengths; and, a means for providing relative movement between the filter and the optical amplifier signal to vary the slope of the filter within the band of operation wavelengths. It should be noted, that relative movement may be actual displacement of one of the filter and the input port or, alternatively, by varying the relative angle between the input port and the filter.

In accordance with the invention there is further provided, an optical amplifier having coupled thereto, an optical filter for dynamic and variable gain tilt control for use with the amplifier, the filter in a predetermined wavelength band having a width of at least 10 nm where gain tilt control is required, having a centre wavelength λc and an amplitude response that has an opposite and counter slope as a function of wavelength to that of the amplifier within the predetermined wavelength band; and, a controller and movement mechanism for varying the slope of the filter in response to a control within the predetermined band, the output response of the filter having a slope throughout the predetermined wavelength band which is always only one of negative and positive.

BRIEF DESCRIPTION OF THE DRAWINGS

Exemplary embodiments of the invention will now be described in conjunction with the drawings, in which:

FIG. 2b is a graph of the output response of a portion of the optical filter shown in FIG. 2a;

FIG. 2c is a front functional view of the optical filter of FIG. 2a;

FIG. 3b is a graph of the output response of a portion of the optical filter shown in FIG. 3a;

FIGS. 5b and 5c are output responses for two different portions of the filter shown in FIG. 5a;

FIG. 6b is a graph of the output response of the three filters shown in FIG. 6a;

DETAILED DESCRIPTION

Referring now to FIG. 1 the gain spectrum of a typical EDFA amplifier is shown wherein it can be seen that the gain as a function of wavelength varies.

For a wide variety of glass hosts, rare earth doped optical amplifiers and particularly EDFAs are effectively homogeneously broadened, and the overlap of dopant ions with the signal modes is nearly wavelength independent. As such, the gain spectrum, here being the small signal gain that would be measured by a weak probe signal while the operating point of the amplifier is fixed, is constrained to a single parameter family of wavelength dependencies. Therefore if gain of the amplifier at some reference wavelength is changed due to a change in input (i.e., pump and/or signal power) the amplifier gain at other wavelengths will change by well defined amounts that likely are to be different from the amount of gain change at the reference wavelength. The wavelength dependence of the amplifier gain change as of result of an input change is referred to herein as dynamic gain tilt. Hence, the dynamic gain tilt is a distortion of the amplifier gain spectrum for operating conditions that differ from the operating point for which the amplifier was designed.

As it was pointed out in the background of this invention, filters have been provided heretofore for offsetting and flattening the gain spectrum of conventional EDFAs. However providing such a fixed filter does not provide a solution to controlling distortion due to dynamic gain tilt a condition that varies with input power of the input optical signal.

Figure 2A:
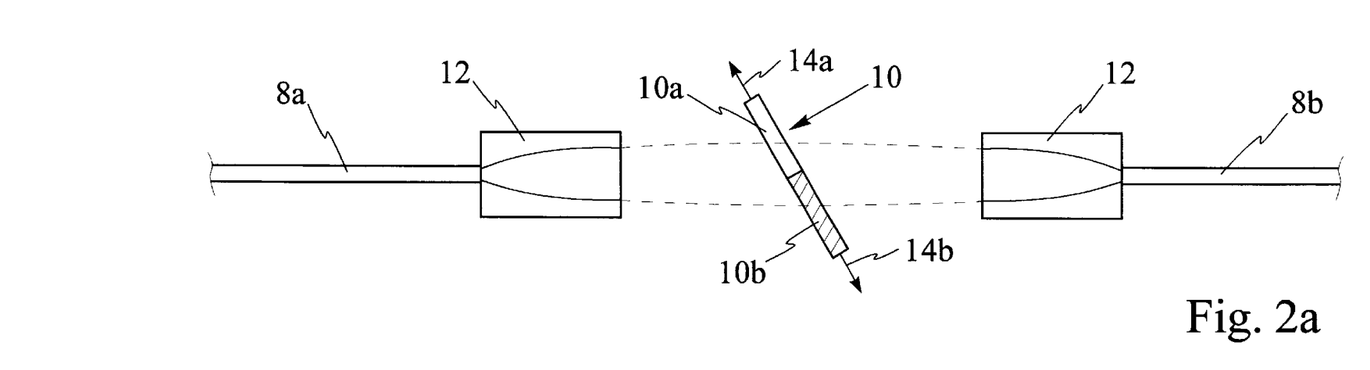
FIG. 2a is a schematic diagram of an optical filter that functions in transmission in accordance with the invention wherein the filter is disposed between a pair of collimating/focusing lenses.
Figure 2B:
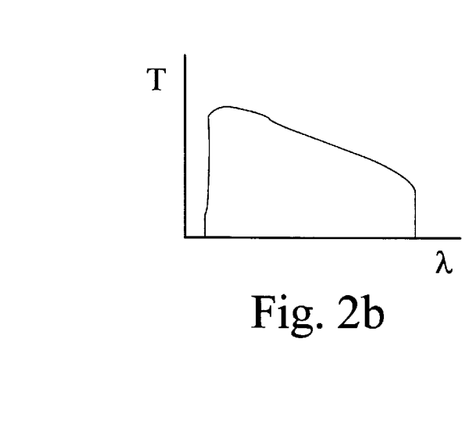
Figure 2C:
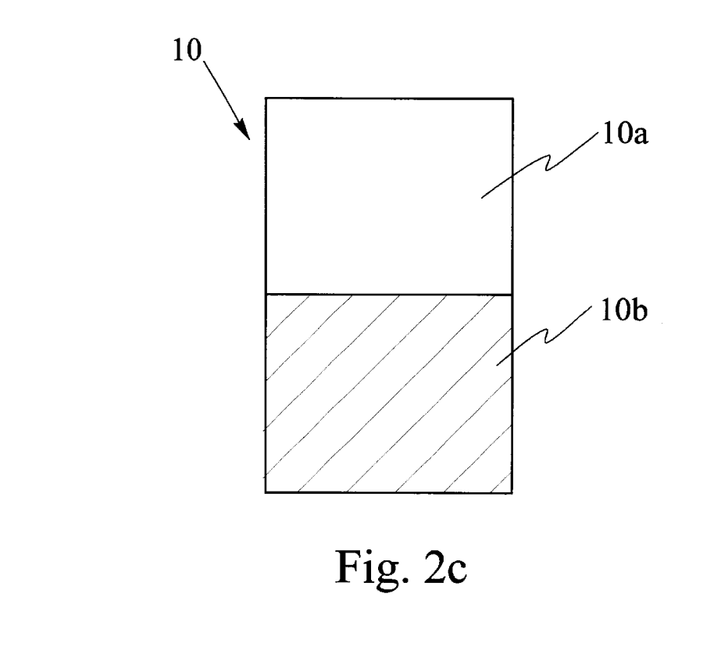

Turning now to FIG. 2a, an arrangement is shown in accordance with this invention, wherein a filter 10, shown in detail in FIG. 2c has a first region 10a consisting of substantially light transmissive material such as clear glass and a second region 10b juxtaposed to the first region having a dichroic multi-layer interference filter disposed thereon. The second region 10b in a preferred embodiment has a sloped transmission response versus wavelength shown in FIG. 2b. The dimension of the first and second region should be at least the size of the beam incident upon the filter. The term filter used within this specification should include any medium that provides an output signal which alters a characteristic of light incident thereupon. In this embodiment, the filter is disposed between two graded index (GRIN) lenses 12 in a conventional manner, wherein the lenses are used to collimate light exiting the optical fibre 8a, to provide a collimated beam at the input side of the filter 10, and for focusing the collimated beam that has traversed the filter 10, for coupling the beam into the optical fibre 8b. Means for moving the filter 10 along a line coincident with arrows 14a and 14b are provided (not shown in FIG. 2a); such means can conveniently be provided in the form of a stepper motor or alternatively in the form of a piezo-electric actuator. Control circuitry and means for moving the filter in dependence upon the control signal are well known in the art and shall not be described.

Figure 3A:
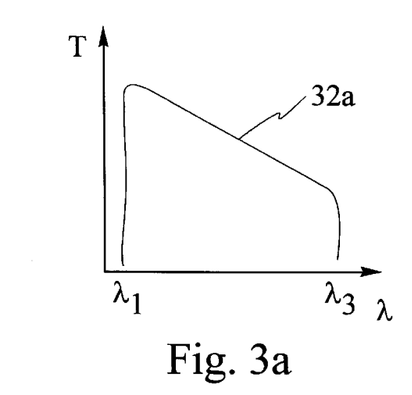
FIG. 3a is a schematic diagram of an alternative embodiment of a optical filter that functions in reflection in accordance with the invention.
Figure 3B:
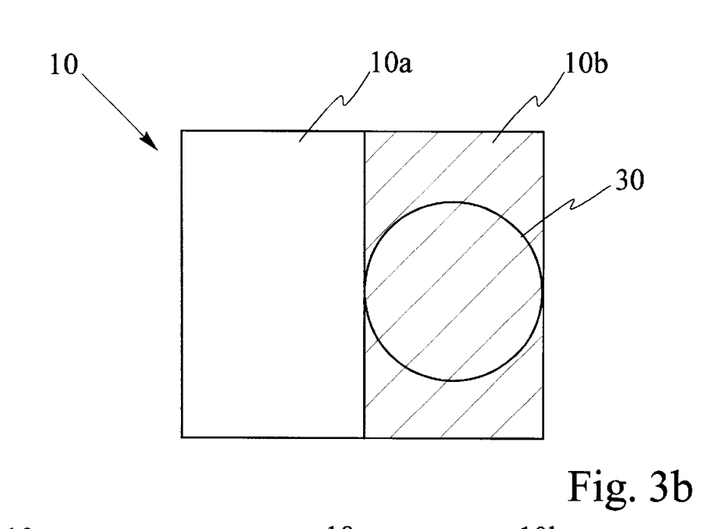
Figure 3C:
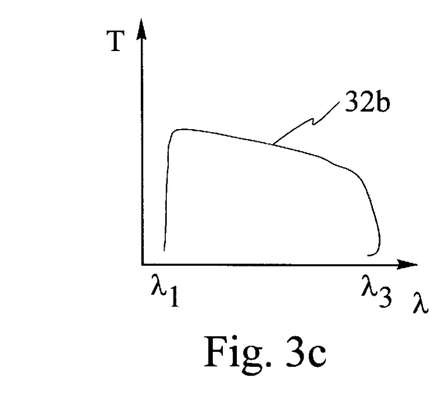
FIG. 3c is a diagram of the filter shown in FIG. 3a wherein the relative position of the beam and the filter has changed.
Figure 3D:
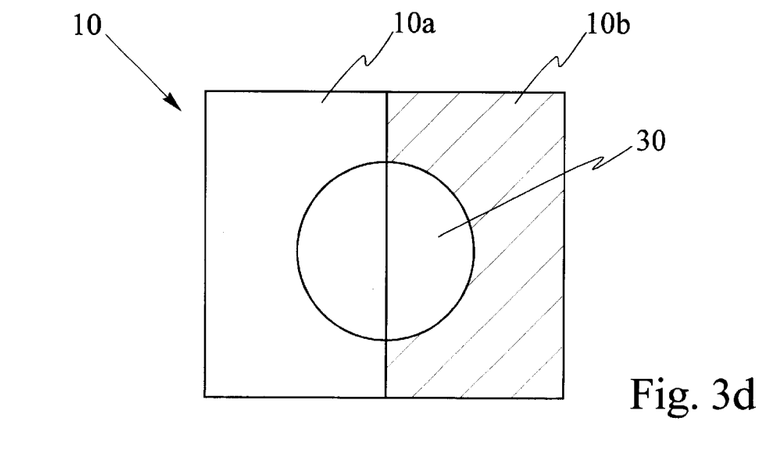
FIG. 3d is a graph of the output response of the filter of FIG. 3c.

In operation, the system in accordance with this invention functions in the following manner. When the filter 10 is disposed in a position such that the beam incident thereon passes entirely through the clear portion 10a of the filter 10, the amplitude of the beam as a function of wavelength is essentially unchanged. Hence if the input beam has a signature or amplitude response such as the spectrum shown in FIG. 1, the output beam that has propagated through the clear portion of the filter 10a will essentially be unaffected and will have the same amplitude response as a function of wavelength. On the other hand, if an input beam has a positive gain tilt due to a change in power of the input beam, passing this beam through the negatively sloped portion 10b of the filter 10 lessens the effect of the positive gain tilt. Most importantly and paramount to this invention, the filter 10 is positionable and dynamically controlled by an actuator and control circuitry (not shown) such that the filter is positionable at locations along the line defined by the arrows 14a and 14b. Hence, a beam incident upon the filter 10 passes through more or less of the portion 10b and less or more of the portion 10a, respectively depending upon the position of the actuator. When a steeper sloped response is required the filter 10 is moved into a position such that less of the beam passes through the clear portion 10a of the filter 10 and more of the beam passes through the portion 10b. By relatively varying position of the beam and the filter such that a greater portion of the beam passes through the region 10b than the region 10a, the slope of the amplitude response with wavelength is augmented, thus affording a means of dynamically controlling for gain tilt. Conversely control of tilt in an opposite direction can be realized by lessening the portion of the beam that passes through the region 10b and increasing the portion that passes through the clear portion 10a of the filter 10. This is illustrated more clearly by viewing FIGS. 3a to 3d. FIG. 3a illustrates a response of the filter 10 and more particularly 10b as it would filter a beam of light 30 having a diameter of approximately 300 μm, traversing the filter through the portion 10b, (as is shown in FIG. 3b). FIG. 3c illustrates a response of the same filter, for a same beam 30 traversing the filter (as is shown in FIG. 3d) through both regions 10a and 10b. It is noted that the absolute value of the slope of the line 32a is greater than the absolute value of the slope of the line 32b since some of the light in FIG. 3d is passing through the clear portion of the filter. In the extreme case, where all of the light is passing through the clear portion 10a of the filter, the filters response is flat, and as more of the light passes through the portion 10b, the absolute value of the slope increases to a maximum, in dependence upon the filter's characteristics.

Figure 4A:
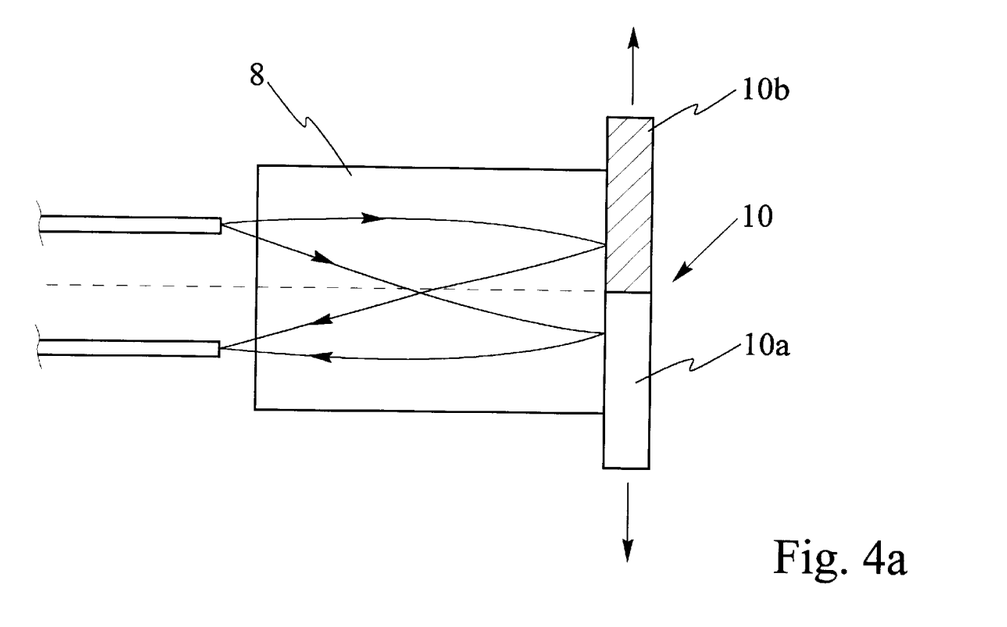
FIG. 4a is a side view of a GRIN lens optically coupled with a movable split filter, in accordance with the invention.
Figure 4B:
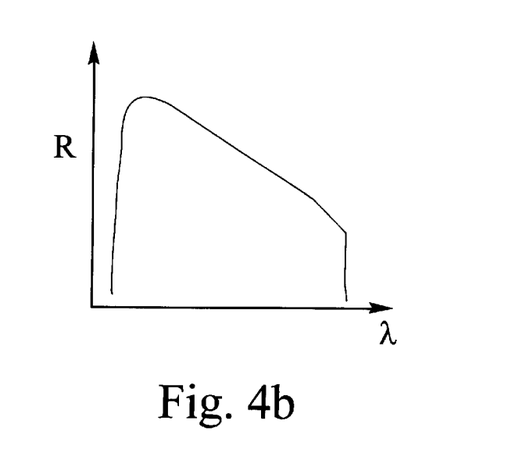
FIG. 4b is a graph of the spectral output response for the attenuating portion of the filter shown in FIG. 4a that is coated with thin film dichroic layers.

Turning now to FIG. 4a, an alternative embodiment of the invention is shown, wherein a first reflective filter 40 is shown having a first portion that is completely reflective to all wavelengths, and a second portion having a reflection response with wavelength shown in FIG. 4b. This embodiment works in a similar manner to the embodiment shown in FIG. 2a, however it is based on reflection rather than transmission. In both of the embodiments shown in FIGS. 2a and 4a a filter having a second portion with negative tilt is shown, however, alternatively a filter with portion with positive tilt can be provided in instances where this is required.

Figure 5A:
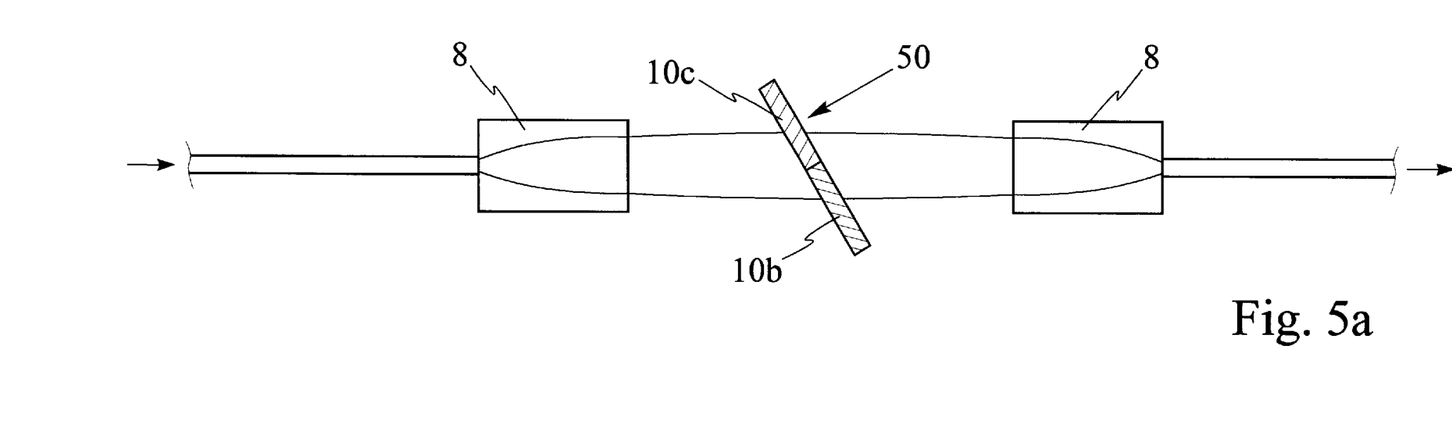
FIG. 5a is a side view of an alternative embodiment of a filter in accordance with the invention.

FIG. 5a illustrates an arrangement similar to that of FIG. 2a, however the filter has a first portion 10c having a response with a positive slope, and a second portion having a response having a negative slope. Alternatively, a hybrid filter can be provided wherein a clear portion 10a is provided having at its extremities filters 10b and 10c as have been described.

Figure 5B:
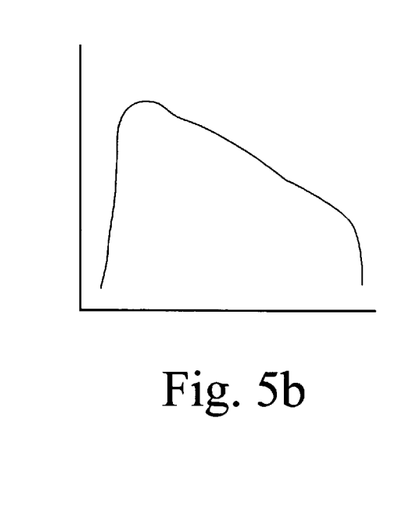
Figure 5C:
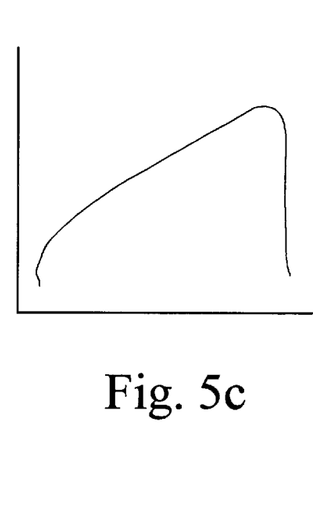

FIGS. 5b and 5c show the output amplitude versus wavelength transmission responses for the filters 10b and 10c respectively.

Figure 6A:
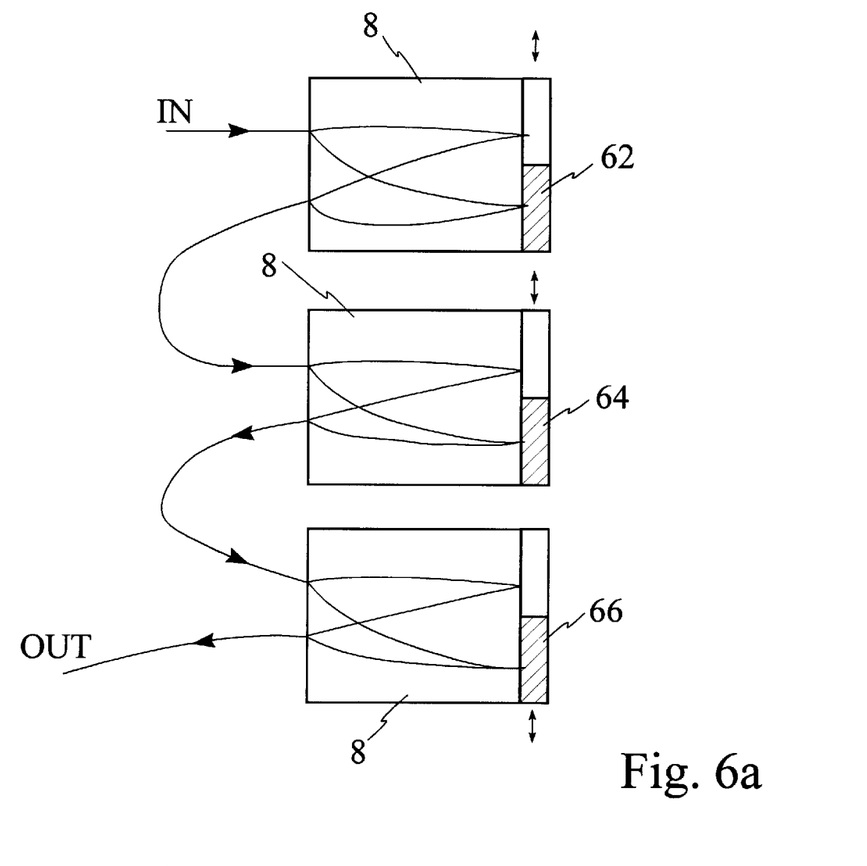
FIG. 6a is an alternative embodiment of the invention wherein 3 cascaded movable filters in accordance with this invention are provided.
Figure 6B:
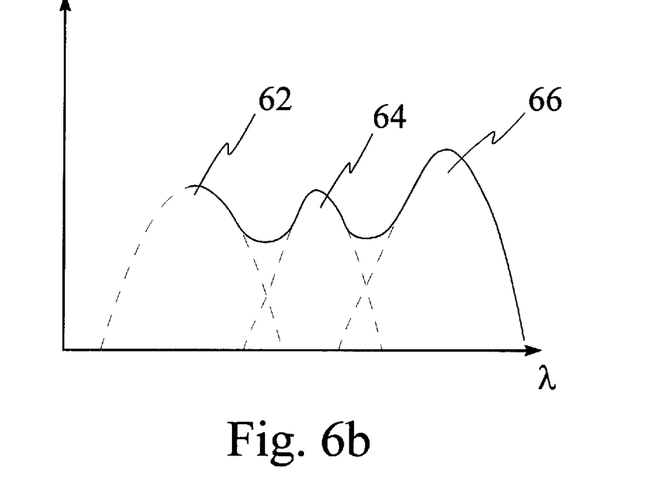

In another embodiment of this invention, a series of cascaded filters of this type can be used as tunable gain flattening filters. FIG. 6a shows an embodiment according to the invention wherein three filters 62, 64, and 66 are each tunable and designed to filter a different wavelength band. FIG. 6b illustrates the response for the three filters, and a dashed line in the graph illustrates the response of the individual filters. Less attenuation can be provided for any of the three wavelength bands by positioning any of the filters such that the beam traverses some or all of the no-attenuating portion of the filters.

Figure 7:
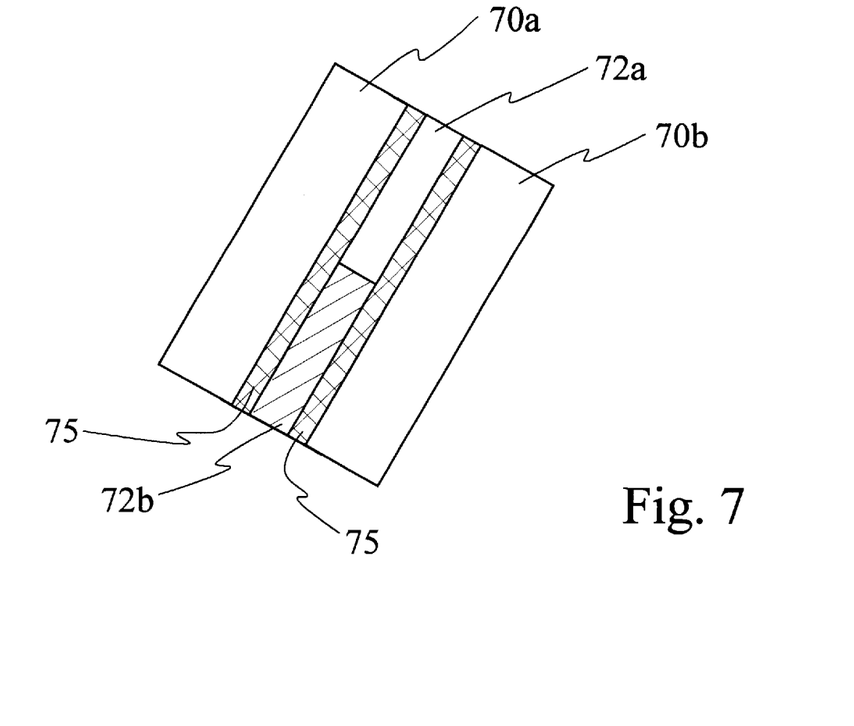
FIG. 7 is a detailed side view of a transmissive filter in accordance with the invention.

In order to lessen unwanted effects of a difference in phase for part of the beam traversing the thin film dichroic filter compared with that portion of the beam traversing the clear glass substrate, the optical length of the two sections 10a and 10b can be matched to the appropriate tolerance. Turning now to FIG. 7, a side view of a transmissive filter in accordance with this invention is shown. Two glass blocks 70a and 70b are provided having an unattenuating substrate 72a and a thin film coated substrate 72b. The inner meeting edges of the two substrates 72a and 72b are polished. Between the glass blocks and the substrates 72a and 72b is a refractive index matching epoxy 75.

Figure 8:
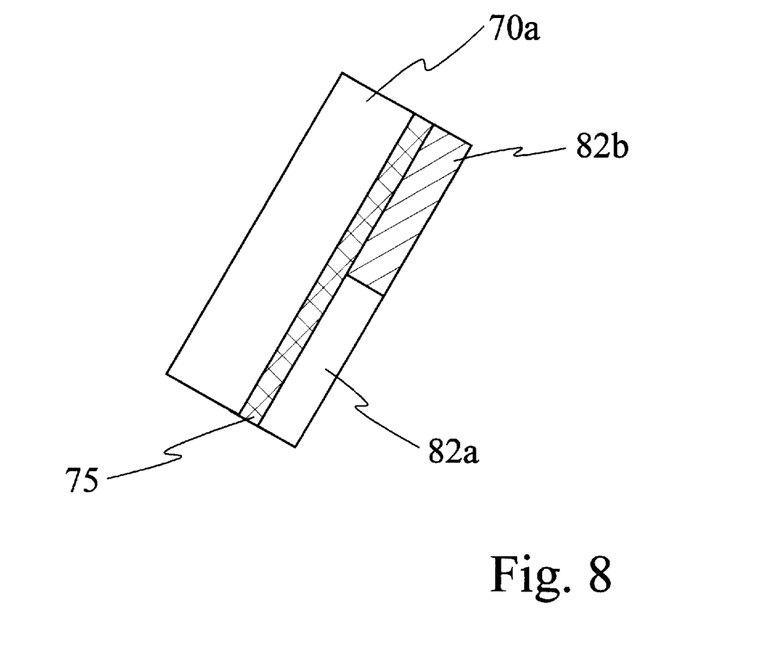
FIG. 8 is a detailed side view of a reflective filter in accordance with the invention.

FIG. 8 shows a detailed side view of a reflective split filter wherein only a single glass block is required. An index matching epoxy is disposed between the glass block 70a and a reflective thin film coated substrate 82b. Adjacent the substrate 82b is a glass substrate 82a having a reflective coating.

Figure 9A:
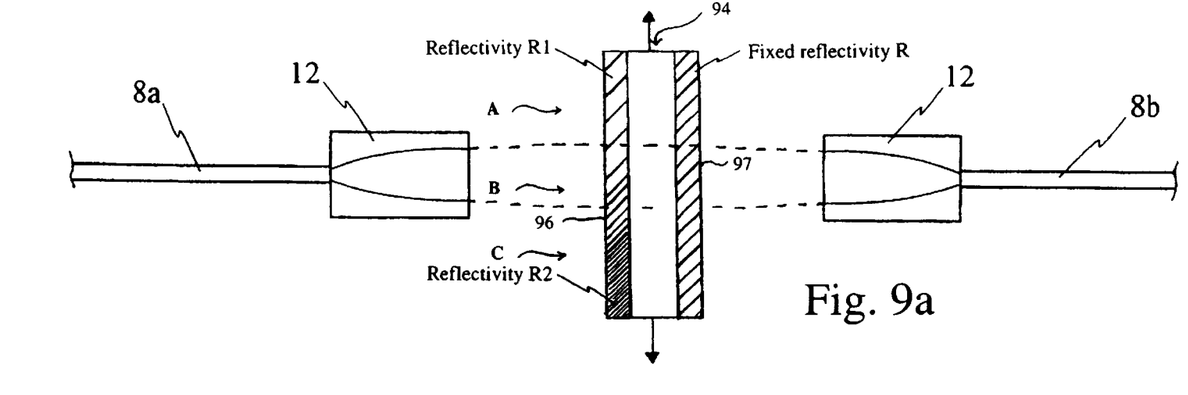
FIG. 9a is a detailed view of an etalon filter in accordance with an aspect of this invention wherein one of the etalon reflective end faces has a continually varying reflectivity (finesse) along a substantial portion of one of its end faces.

Turning now to FIG. 9a, an etalon filter 94 is shown having an input end face 96 coated in such a manner as to have the reflectivity varying substantially linearly along its length in a direction from high reflectivity to lower reflectivity towards the bottom of the filter. The difference between the highest reflectivity and the lower reflectivity is greater than 10%. For example at the high end, the reflectivity might be 55% corresponding to a finesse of approximately 5, and at the lower reflectivity end, where the desired slope may be zero, the corresponding finesse or reflectivity would be zero. The opposite end face 97, in this example has a constant reflectivity coating along its length, however is not limited to such. The etalon can be conveniently made of a single light transmissive block having two at least partially reflective end faces coated end faces. Since the input end face has a coating with a reflectivity which varies along the length thereof, by moving the light beam to be filtered and/or the etalon, relatively, light will pass through the etalon such that the etalon will have a different finesse at different relative positions. By so doing, the slope of the output response of the etalon changes within a wavelength range of interest. Of course the free spectral range of the etalon must be chosen to provide a suitable window between two different adjacent zero sloping regions of the etalon, and of course the etalon must be tuned or selected to such that the sign (+/−) of the slope is suitable to offset the unwanted tilt of the amplifier to which it is coupled. Hence, a suitable fixed etalon or tunable etalon can be used. In a preferred embodiment, the free spectral range would likely exceed 10 nm, however in other applications it would be preferred to have an etalon with an free spectral range which exceeds 0.5 nm.

Figure 9B:
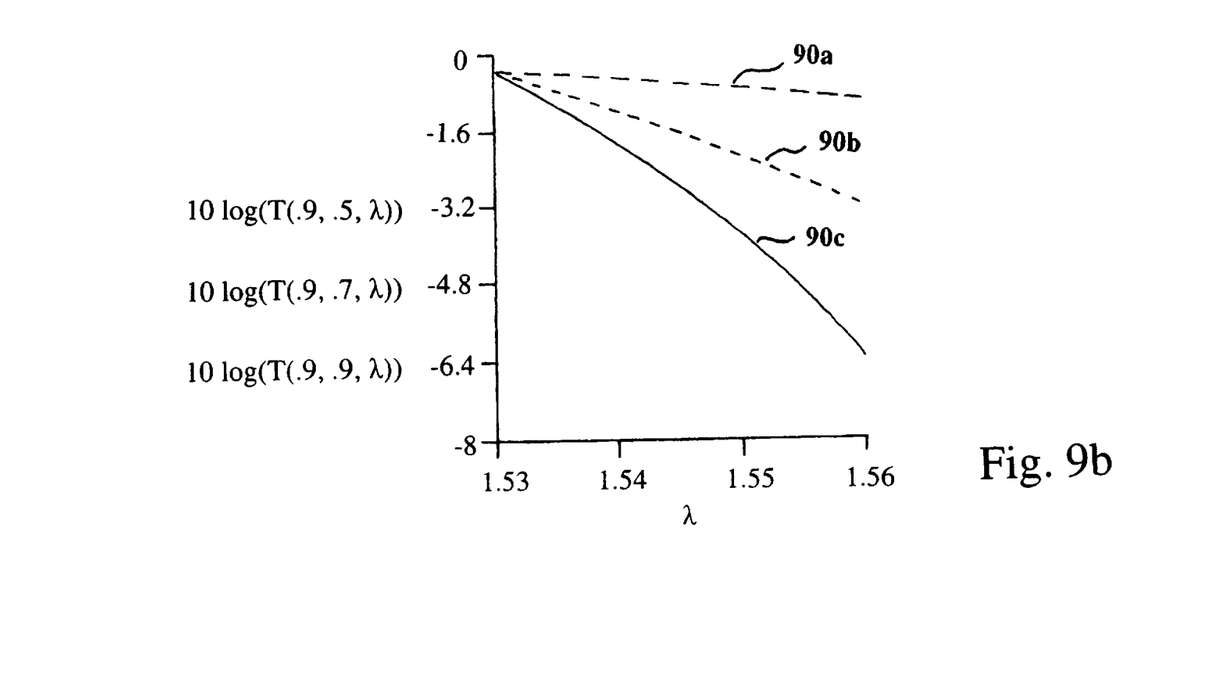
FIG. 9b is a graph of wavelength versus amplitude for the etalon filter shown in FIG. 9a, wherein three plots are shown for the filter in three different positions with respect to an input beam of light.

FIG. 9b illustrates three output responses of the filter shown in FIG. 9a for light launched into three locations along the varying reflective end face. A first sinusoidal-like wave labeled 90a illustrates the amplitude output response versus wavelength for light launched into location A. The second sinusoidal-like wave labeled 90b illustrates the amplitude output response versus wavelength for light launched into location B; and the third sinusoidal-like wave labeled 90c illustrates the amplitude output response versus wavelength for light launched into location C. Since the amplitude of the three sinusoidal-like waves is significantly different, the corresponding slopes of each of the sinusoidal-like waveforms varies as well. By using this sloped part of the response as the useful working range of the filter, and varying the slope within this working range without varying the centre operating wavelength, a useful filter is provided for controlling unwanted gain tilt from an in-line amplifier.

Figure 9C:
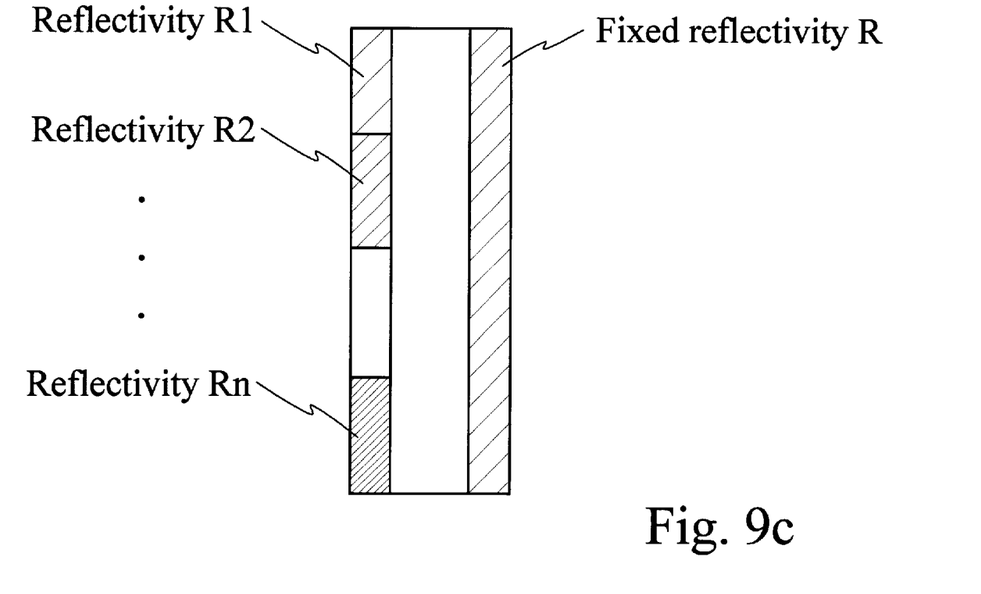
FIG. 9c is a detailed view of an etalon filter in accordance with an aspect of this invention wherein one of the etalon reflective end faces has a discretely varying reflectivity (finesse) along a portion of one of its end faces.

FIG. 9c is similar to that of FIG. 9a, however the input end face of the etalon has three different discrete portions essentially providing a three-stepped-finesse etalon.

Figure 9D:
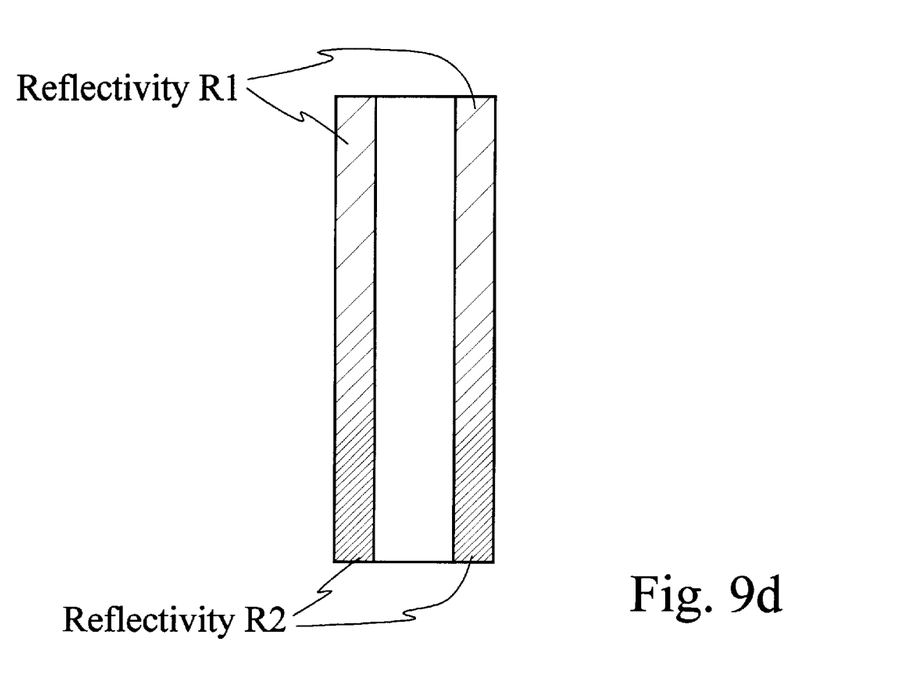
FIG. 9d is a detailed view of an etalon filter having variable reflectance surfaces at each end.

FIG. 9d shows an etalon wherein each end face has a variable reflectance; here a beam of light incident at a location of the etalon would reflect between two surfaces having a same reflectance, however when the input port is moved by relatively moving at least one of the port and the etalon, the reflectance is varied.

Within this specification different regions of the filter may be distinct and different regions, or alternatively may be different regions having some common portions. For example relatively moving an input port and a variable reflectance face of the etalon described heretofore, is considered launching a beam into different regions of the etalon filter.

Of course, numerous other embodiments may be envisaged, without departing from the sprit and scope of the invention. For example, in the embodiments shown heretofore, the filter is shown and described to be movable, however, an embodiment wherein the beam is shifted can be realized.

What is claimed is:

1. A resonant optical cavity filter having a free spectral range greater than 10 nm, said cavity filter having a first end face and an at least second partially reflective end face, the first end face being partially reflective and having a reflectivity along regions thereof which varies by at least 10%, wherein a light beam to be filtered through said cavity filter and the cavity filter are relatively moveable with respect to each other.

2. A resonant optical cavity filter as defined in claim 1, wherein the first end face has a reflectivity, which varies by at least 15%, over at least a region in a linear manner.

3. A resonant optical cavity filter as defined in claim 1, wherein the first end face has a reflectivity which varies in a step-wise manner, a first portion of the first end face having a reflectivity $R_1$ that is different than a second portion having a reflectivity $R_2$ of the first end face, wherein $R_1-R_2>0.1$.

4. A resonant optical cavity filter as defined in claim 1, wherein the second end face has a region of a first reflectance and at least a second region of a second reflectance, the first reflectance minus the second reflectance >0.1.

5. An optical filter for providing a variable slope output response, the optical filter comprising a resonant cavity having an end face with a variable reflectivity along its length and having an input port for filtering provided thereto, the optical filter having a free spectral range greater than 0.5 nm, the filter being a Fabry-Perôt cavity having an end face with a varying reflectance along a portion of its length such that there are at least two regions of said end face having a different finesse which differs by at least 10%.

6. An optical filter as defined in claim 5, wherein the end face with the varying reflectance has a linearly varying reflectance along a portion of its length.

7. An optical filter as defined in claim 5, wherein the end face with the varying reflectance has a discrete regions of different reflectance.

8. An optical filter for providing a variable slope output response between a first and a second filtering position, the filter comprising a resonant cavity having two at least partially reflective end faces, one of the end faces with a variable reflectivity along its length, wherein the resonant cavity and a beam of light to be filtered through said resonant cavity are relatively moveable between the first and second filtering position.

9. A variable reflectivity optical filter according to claim 8 for in-line use with an optical amplifier signal, the filter being disposed at an input side, an output side, or within the optical amplifier, the filter having a wavelength response that is substantially linear in slope within a band of operation wavelengths of the amplifier, within a substantial portion of an operating wavelength band the slope of the filter in said band of wavelengths being between zero and a only one of a positive or negative number, the filter for passing a band of wavelengths having a centre wavelength λc and having an amplitude response that has an opposite and counter slope as a function of wavelength to that of a gain tilt of the amplifier within the operation band of wavelengths, the filter being an etalon having a varying reflectance along an end face thereof; and, a means for providing relative movement between the etalon filter and the optical amplifier signal to vary the slope of the filter by means of varying the amplitude wavelength response of the filter.

10. The variable optical filter as defined in claim 9, wherein the etalon has two at least partial reflectors spaced at least predetermined distance apart to provide a suitable free spectral range for operating the optical filter and, wherein at least one of the reflectors has a varying reflectance along its length.

11. The variable optical filter as defined in claim 10 wherein the varying reflectance is substantially varying in a continuous manner along a portion of one side of a face of the etalon to provide a plurality of reflectances as the optical signal and the filter are relatively moved.

12. The variable optical filter as defined in claim 11 wherein the varying reflectance is substantially varying in a discrete manner along a portion of one side of a face of the etalon to provide a plurality of reflectances as the optical signal and the filter are relatively moved.

13. The variable optical filter as defined in claim 9 wherein the centre wavelength of the filter in the band of operation is substantially unchanged.

14. A method of controlling an optical filter of claim 8 comprising the steps of:

a) providing a filter of claim 8 having at least two different regions, a first region having a first sloped amplitude response with wavelength, and a second other region having a different response;

b) launching the beam into the filter; and, c) relatively moving the beam and the filter in a controlled manner so that a ratio of a portion of the beam passing through the first region and a portion of the beam passing through the second other region is varied.

15. A method as defined in claim 14, wherein the step of launching the beam into the filter includes simultaneously passing portions of the beam in a controlled manner through at least two different regions of a filter, the different regions having a different amplitude response, one of the regions of the filter having a response that is substantially sloped, the filter being moved such that the beam partially propagates through portions of both regions, the portions of the beam propagating through the different regions being varied.

* * * * *